US012552138B2

(12) United States Patent
Turner et al.

(10) Patent No.: US 12,552,138 B2
(45) Date of Patent: Feb. 17, 2026

(54) POLYESTER FILMS AND DEVICES CONTAINING THEM

(71) Applicant: Mylar Specialty Films U.S. Limited Partnership, Chester, VA (US)

(72) Inventors: David Turner, Wilton (GB); Stephen Sankey, Wilton (GB); Louise Taylor, Wilton (GB); Stephen Jones, Wilton (GB)

(73) Assignee: Mylar Specialty Films U.S. Limited Partnership, Chester, VA (US)

( * ) Notice: Subject to any disclaimer, the term of this patent is extended or adjusted under 35 U.S.C. 154(b) by 245 days.

(21) Appl. No.: 18/318,147

(22) Filed: May 16, 2023

(65) Prior Publication Data

US 2023/0278321 A1 Sep. 7, 2023

Related U.S. Application Data

(62) Division of application No. 16/762,913, filed as application No. PCT/GB2018/053269 on Nov. 13, 2018, now Pat. No. 11,701,869.

(30) Foreign Application Priority Data

Nov. 13, 2017 (GB) .................................. 1718707

(51) Int. Cl.
| | |
|---|---|
| B32B 27/08 | (2006.01) |
| B29C 48/00 | (2019.01) |
| B29C 48/08 | (2019.01) |
| B29C 48/16 | (2019.01) |
| B29C 48/21 | (2019.01) |
| B29C 48/88 | (2019.01) |
| B29C 48/91 | (2019.01) |
| B29C 51/14 | (2006.01) |
| B29C 55/14 | (2006.01) |
| B32B 7/12 | (2006.01) |
| B32B 27/36 | (2006.01) |
| G06F 3/044 | (2006.01) |
| B29K 67/00 | (2006.01) |
| B29K 105/00 | (2006.01) |
| B29L 31/34 | (2006.01) |

(52) U.S. Cl.
CPC .......... *B32B 27/08* (2013.01); *B29C 48/0018* (2019.02); *B29C 48/0021* (2019.02); *B29C 48/08* (2019.02); *B29C 48/16* (2019.02); *B29C 48/21* (2019.02); *B29C 48/91* (2019.02); *B29C 48/914* (2019.02); *B29C 51/14* (2013.01); *B29C 55/143* (2013.01); *B32B 7/12* (2013.01); *B32B 27/36* (2013.01); *G06F 3/044* (2013.01); B29K 2067/00 (2013.01); B29K 2105/0085 (2013.01); B29K 2995/0053 (2013.01); B29L 2031/3475 (2013.01); B32B 2250/03 (2013.01); B32B 2250/244 (2013.01); B32B 2250/40 (2013.01); B32B 2255/10 (2013.01); B32B 2255/26 (2013.01); B32B 2270/00 (2013.01); B32B 2307/412 (2013.01); B32B 2307/518 (2013.01); B32B 2307/54 (2013.01); B32B 2307/584 (2013.01); B32B 2307/714 (2013.01); B32B 2307/734 (2013.01); B32B 2307/75 (2013.01); B32B 2457/208 (2013.01); G06F 2203/04103 (2013.01)

(58) Field of Classification Search
CPC ..................................................... B32B 27/36
See application file for complete search history.

(56) References Cited

U.S. PATENT DOCUMENTS

| 4,734,335 | A | 3/1988 | Monzer |
| 5,215,825 | A | 6/1993 | Hiraoka et al. |
| 11,701,869 | B2 | 7/2023 | Turner et al. |

FOREIGN PATENT DOCUMENTS

| EP | 0 493 008 A2 | 7/1992 |
| EP | 1 279 972 A1 | 1/2003 |
| EP | 3 241 674 A1 | 11/2017 |
| JP | 2007-111877 A | 5/2007 |
| JP | 2017-062609 A | 3/2017 |
| KR | 20160140226 A | 12/2016 |
| WO | WO 00/46026 A1 | 8/2000 |
| WO | WO 2009/145565 A2 | 12/2009 |
| WO | WO 2011/030098 A1 | 3/2011 |
| WO | WO 2012/123699 A1 | 9/2012 |

OTHER PUBLICATIONS

Search Report under Section 17 for GB Application No. GB 1718707.1 dated Apr. 9, 2018.

(Continued)

*Primary Examiner* — Prashant J Khatri
(74) *Attorney, Agent, or Firm* — Wolf, Greenfield & Sacks, P.C.

(57) ABSTRACT

A thermoformable biaxially oriented coextruded polyester film comprising a copolyester base layer B, a first polyester outer layer A1 and a second polyester outer layer A2, wherein said outer layers are disposed on opposite surfaces of said base layer, and wherein:

(i) said base layer B comprises a copolyester derived from terephthalic acid (TA) and a second aromatic dicarboxylic acid and one or more diol(s), wherein said second aromatic dicarboxylic acid is present in the copolyester in an amount of from about 5 to about 20 mol % of the acid fraction of the copolyester;

(ii) the polyester of each of said outer layers A1 and A2 is selected from polyethylene terephthalate (PET); and (iii) the thickness of the base layer constitutes at least 90% of the total thickness of the coextruded multi-layer polyester film.

20 Claims, No Drawings

(56) References Cited

OTHER PUBLICATIONS

International Search Report and Written Opinion for PCT/GB2018/053269 mailed Jan. 18, 2019.
International Preliminary Report on Patentability for PCT/GB2018/053269 mailed Feb. 20, 2020.
Office Action for Chinese Application No. 201880071048.8 dated Aug. 27, 2021.
[No Author Listed], Permeability—Haze (Cloudiness Value) and Light Transmittance. DJK Corporation. Aug. 29, 2010. https://www.djklab.com/service/koubunshibussei/510#:~:text [last accessed Oct. 4, 2022]. 12 pages.

POLYESTER FILMS AND DEVICES CONTAINING THEM

RELATED APPLICATIONS

This application is a divisional of U.S. Application Ser. No. 16/762,913, filed May 8, 2020, which is a U.S. National Stage patent application based on International Application PCT/GB2018/053269, filed Nov. 13, 2018, which claims the benefit of United Kingdom Application No. 1718707.1, filed Nov. 13, 2017, each of which is incorporated herein by reference in its entirety.

The present invention relates to thermoformable polyester films and their use in electronic devices, particularly in the touch-screen interface of such devices.

Polymeric films have been widely used in screens, including touch-screens, for electronic devices because of their advantageous combination of mechanical strength, dimensional stability and optical properties. The major uses for such devices are within the automotive, domestic appliance and consumer electronics markets, whereby consumers are increasingly demanding greater design flexibility and product interaction through touch-screen interfaces, particularly capacitive touch-screen interfaces. In-Mould Electronic (IME) or In-Mould Decoration (IMD) technology utilises polymeric film for the assembly of such screens using injection-moulded parts. A specific embodiment of such technology is Film-Insert Moulding (FIM), wherein film is printed, formed and back-filled via injection-moulding. These processes allow for labelling and graphics to be applied to plastic parts during the moulding process, and also enable components to be integrated into a single unit. Applications for the technology are varied and include automotive and industrial instrument panels, displays, domestic appliance fascias, medical device fascias, consumer electronics body parts, and automotive interior decoration.

Polycarbonate (PC) film has traditionally been utilised for such applications because of its excellent thermoformability, printability and optical clarity, and is the current industrial standard. In general, the polymeric film is printed with information and/or graphics on the internal surface prior to being thermoformed, and then back-filled with plastic material in an injection-moulding process, resulting in a rigid module, typically at least about 1 mm thick, with the graphics layer protected behind the film. Once thermoformed, the film should exhibit no or minimal relaxation at elevated temperatures and/or humid conditions in order to avoid a loss of the thermoformed shape. The thermoformed film should also exhibit good chemical resistance. The thermoformed film should also exhibit good scratch resistance, which is normally imparted to polycarbonate thermoformable films by the application of an additional hard-coat onto the film surface.

However, there is a need for improved thermoformable materials. In particular, there is a need to improve the chemical resistance and/or scratch resistance and/or mechanical properties of thermoformable films, as well as a need to simplify manufacture, while at least maintaining the thermoformable characteristics of the currently commercially available films, particularly the known polycarbonate films. The mechanical property in which improvement is particularly sought is the flex resistance. The film should also exhibit excellent or improved printability, particularly with electro-conductive inks. It is also desired to reduce the thickness of the thermoformable polymeric film.

It is an objective of this invention to address one or more of the afore-mentioned problems.

According to a first aspect of the present invention, there is provided a thermoformable biaxially oriented coextruded polyester film comprising a copolyester base layer B, a first polyester outer layer A1 and a second polyester outer layer A2, wherein said outer layers are disposed on opposite surfaces of said base layer, and wherein:

(i) said base layer B comprises a copolyester derived from terephthalic acid (TA) and a second aromatic dicarboxylic acid and one or more diol(s), wherein said second aromatic dicarboxylic acid is present in the copolyester in an amount of from about to about mol % of the acid fraction of the copolyester, and wherein said copolyester makes up at least 90% by weight of the total weight of the base layer;

(ii) the polyester of each of said outer layers A1 and A2 is selected from polyethylene terephthalate (PET); and (iii) the thickness of the base layer constitutes at least 90% of the total thickness of the coextruded multi-layer polyester film.

The present inventors have found that, unexpectedly, a polyester film is able to provide excellent thermoformability while retaining the high optical transparency required for use as a screen in an electronic device, as well as retaining the high dimensional stability required to withstand the elevated temperatures experienced during fabrication of the device. The thermoformable polyester films of the present invention may be thermoformed at the high thermoforming temperatures used for the conventional polycarbonate films, and are able to withstand downstream processing without suffering micro-cracks. The polyester films exhibit excellent chemical resistance, scratch resistance and mechanical properties, particularly flex resistance. Moreover, the thermoformable polyester film has a greater modulus and exhibits the required mechanical strength at lower thicknesses, relative to polycarbonate.

The biaxially oriented coextruded polyester film described herein is a self-supporting film or sheet by which is meant a film or sheet capable of independent existence in the absence of a supporting base. In the present invention, both the base layer and each of the outer layers are self-supporting.

The polyesters which make up the multi-layer film are preferably synthetic linear polyesters. The polyesters are suitably thermoplastic polyesters. Suitable polyesters are obtainable by condensing one or more dicarboxylic acid(s) or their lower alkyl (up to 6 carbon atoms) diesters with one or more diols. The dicarboxylic acid component contains at least one aromatic dicarboxylic acid, preferably terephthalic acid (TA). Isophthalic acid (IPA) is also present in the copolyester of the base layer. The diols are preferably selected from aliphatic diols, and preferably from ethylene glycol (EG). Film-forming polyester resin (i.e. the polyesters and copolyesters described in more detail below) is the major component of a layer of the multi-layer film, and makes up at least 50% by weight of the total weight of a given layer, preferably at least 65%, typically at least 80%, more typically at least 85% by weight of the total weight of a given layer.

Each of the polyester outer layers A1 and A2 comprises PET. PET is a crystallisable polyester. Preferably the polyester is a homopolyester, i.e. it contains only one glycol, namely ethylene glycol, and one aromatic dicarboxylic acid, namely terephthalic acid. The polyester of the outer layers may optionally contain minor amounts of one or more residues derived from other dicarboxylic acids and/or diols but where such minor amounts are present then the total amount of other dicarboxylic acid(s) is preferably no more than 5.0 mol %, preferably no more than 3.0 mol %, preferably no more than 2.0 mol %, preferably no more than 1.5 mol %, preferably no more than 1.0 mol % of the total dicarboxylic acid fraction of polyester and/or the total amount of other diol(s) is preferably no more than 5.0 mol %, preferably no more than 3.0 mol %, preferably no more than 2.0 mol %, preferably no more than 1.5 mol %, preferably no more than 1.0 mol % of the total diol fraction of the polyester. Preferably PET (preferably PET homopolyester) is the only polyester in an outer layer A1 and A2. The polyester preferably makes up at least 50% by weight of the total weight of an outer layer, preferably at least 65%, preferably at least 80%, preferably at least 85%, preferably at least 90%, preferably at least 95%, preferably at least 98%, preferably at least 99%, and preferably substantially all, by weight, of the total weight of an outer layer. In one advantageous embodiment, the or each outer layer consists or consists essentially of said polyester.

The intrinsic viscosity of said polyester itself is preferably at least about 0.60, typically no more than 0.70, typically no more than 0.65.

Preferably, the copolyester of the base layer is derived from monomers selected from the group consisting of terephthalic acid (TA), a second aromatic dicarboxylic acid and ethylene glycol, wherein the monomers from which said copolyester is derived are terephthalic acid (TA), a second aromatic dicarboxylic acid and ethylene glycol. Preferably the copolyester contains ethylene glycol as the only diol. The copolyester may optionally contain minor amounts of one or more residues derived from other diols but where such minor amounts are present then the total amount of said other diol(s) is preferably no more than 5.0 mol %, preferably no more than 3.0 mol %, preferably no more than 2.0 mol %, preferably no more than 1.5 mol %, preferably no more than 1.0 mol % of the total diol fraction of the copolyester. The second aromatic dicarboxylic acid preferably contains a single aromatic ring, and is preferably isophthalic acid (IPA). The second aromatic dicarboxylic acid is present in an amount of from about 5 to about 20 mol %, preferably from about 8 to about 16 mol %, preferably from about 10 to about 14 mol %, preferably about 12 mol % of the acid fraction of the copolyester.

The copolyester of the base layer preferably has a crystalline melting point (Tm) in the range of from about 210 to about 240° C., preferably from about 215 to about 235° C., preferably from about 220 to about 230° C.

The copolyester of the base layer preferably has a glass transition temperature (Tg) in the range of from about 60 to about 90° C., preferably from about 65 to about 85° C., preferably from about 70 to about 80° C.

The intrinsic viscosity of said copolyester itself is preferably at least about 0.60, preferably at least about 0.65, and preferably no more than 0.70.

The copolyester of the base layer preferably has a lower melting point than the outer layer polyesters, preferably wherein the melting point of the copolyester is at least about 10° C., preferably at least about 25° C., preferably at least about 40° C. lower than the melting point of said outer layer polyester, and preferably no more than about 60° C., preferably no more than about 50° C. lower than the melting point of said outer layer polyester.

The copolyester makes up at least 90%, preferably at least 95%, preferably at least 98%, preferably at least 99%, and preferably substantially all, by weight, of the total weight of the base layer. In one advantageous embodiment, the base layer consists or consists essentially of said copolyester.

Formation of the polyesters and copolyesters described hereinabove is conveniently effected in a known manner by condensation or ester interchange, generally at temperatures up to about 295° C. In a preferred embodiment, solid state polymerisation may be used to increase the intrinsic viscosity of polyesters to the desired value, using conventional techniques well-known in the art, for instance using a fluidised bed such as a nitrogen fluidised bed or a vacuum fluidised bed using a rotary vacuum drier. In the following description of polymer and film manufacture, it will be understood that the term "polyester" includes "copolyester".

Formation of the multi-layer polyester film of the present invention is effected by conventional co-extrusion techniques well-known in the art. In general terms, the co-extrusion process comprises the steps of co-extruding the respective polyester compositions through independent orifices of a multi-orifice die, and thereafter uniting the still molten layers or, preferably, by single-channel co-extrusion in which molten streams of the respective polyesters are first united within a channel leading to a die manifold, and thereafter extruded together from the die orifice under conditions of streamline flow without intermixing thereby to produce a laminated film. Thus, the copolyester of the base layer and the polyester of the outer layers (A1) and (A2) are co-extruded. The extrusion is generally carried out at a temperature within the range of from about 250 to about 300° C., and is followed by quenching the extrudate and orienting the quenched extrudate. Preferably the copolyester which forms the base layer is extruded at a temperature which is lower than that used for the extrusion of the polyester which forms the outer layers. Preferably the polyester which forms the outer layers is extruded at a temperature from about 260 to about 300° C., preferably from about 260 to about 280° C.

Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties. In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation. In the preferred flat film process, the film-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester materials (i.e. both the copolyester of the base layer and the polyester of the outer layers). Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is generally effected so that the dimension of the oriented film is from 2 to times, more preferably 2.5 to 4.5 times, preferably from 2.5 to 3.5 times, and more preferably from about 3.0 to about 3.4 times, its original dimension in the or each direction of stretching. Typically, stretching is effected at temperatures higher than the Tg of the polyester, preferably about 15° C. higher than the Tg. Greater draw ratios (for example, up to about 8 times) may be used if orientation in only one direction is required. It is not necessary to stretch equally in the machine and transverse directions although this is preferred if balanced properties are desired.

The stretched film may be, and preferably is, dimensionally stabilised by heat-setting under dimensional support at a temperature above the glass transition temperature of the polyester but below the melting temperature thereof, to induce the desired crystallisation of the polyester. During the heat-setting, a small amount of dimensional relaxation is preferably performed in the transverse direction (TD) by a procedure known as "toe-in". In the present invention, preferably the dimensional relaxation during heat-setting is in the range of from about 0 to about 10.0%, preferably from about 2.0 to about 10.0%, preferably no more than 6.0%, preferably no more than 5.0%, preferably no more than 4.0%, and preferably in the range of from about 2.0 to about 4.0%. An analogous dimensional relaxation in the process or machine direction (MD) is difficult to achieve since low line tensions are required and film control and winding becomes problematic. The actual heat-set temperature and time will vary depending on the composition of the film and its desired final thermal shrinkage but should not be selected so as to substantially degrade the toughness properties of the film such as tear resistance. Within these constraints, a heat set temperature of about 165 to 245° C. is generally desirable, preferably no more than about 230° C., preferably no more than about 220° C., preferably no more than about 215° C., and preferably in the range of from about 185 to about 215° C., preferably from about 190 to about 210° C. In a particularly preferred embodiment, at least part of the heat-setting step is conducted at a temperature in the range of from about 205 to about 215° C., and preferably about 210° C. In a particularly preferred embodiment, heat-setting is conducted in a multiple-zone (preferably three zones or four zones) crystalliser, preferably wherein the temperature of the final zone is lower than the temperature of the first zone, and preferably wherein each zone is at successively lower temperatures within the afore mentioned ranges, preferably wherein the first zone is at a temperature of from about 205 to about 215° C., and the final zone is at a temperature in the range of from about 165 to about 215° C., preferably in the range of from about 165 to about 200° C., preferably in the range of from about 165 to about 190° C., preferably in the range of from about 170 to about 190° C. In the process of manufacturing the films of the present, the afore-mentioned combination of toe-in and heat-set temperature is important in generating the desired crystallinity, dimensional stability, chemical properties and mechanical properties.

After heat-setting the film is typically quenched rapidly in order induce the desired crystallinity of the polyester materials.

The film may be further stabilized through use of an in-line relaxation stage. Alternatively the relaxation treatment can be performed off-line. In this additional step, the film is heated at a temperature lower than that of the heat-setting stage, and with a much reduced MD and TD tension. The tension experienced by the film is a low tension and typically less than 5 kg/m, preferably less than 3.5 kg/m, more preferably in the range of from 1 to about 2.5 kg/m, and typically in the range of 1.5 to 2 kg/m of film width. For a relaxation process which controls the film speed, the reduction in film speed (and therefore the strain relaxation) is typically in the range 0 to 2.5%, preferably 0.5 to 2.0%.

There is no increase in the transverse dimension of the film during the heat-stabilisation step. The temperature to be used for the heat stabilisation step can vary depending on the desired combination of properties from the final film, with a higher temperature giving better, i.e. lower, residual shrinkage properties. A temperature of 135 to 250° C. is generally desirable, preferably 150 to 230° C., more preferably 170 to 200° C. The duration of heating will depend on the temperature used but is typically in the range of 10 to 40 seconds, with a duration of to seconds being preferred. This heat stabilisation process can be carried out by a variety of methods, including flat and vertical configurations and either "off-line" as a separate process step or "in-line" as a continuation of the film manufacturing process. Film thus processed will exhibit a smaller thermal shrinkage than that produced in the absence of such post heat-setting relaxation.

Thus, in a second aspect of the invention there is provided a process for manufacturing the thermoformable polyester film as described herein wherein said process comprises the steps of:
(i) Coextruding said copolyester base layer B, said first polyester outer layer A1 and said second polyester outer layer A2, such that said outer layers are disposed on opposite surfaces of said base layer;
(ii) Quenching the extrudate;
(iii) Stretching the quenched extrudate in at least one direction at a temperature above the glass transition temperature of the polyester material; and
(iv) Heat-setting the stretched film at a temperature in the range of from about 185 to about 215° C., wherein dimensional relaxation in the range of from about 2 to about 10% in the transverse dimension of the film is effected during the heat-setting thereof.

The preferences disclosed hereinabove for the first aspect of the invention apply also to the second aspect.

The base layer and/or one or both outer layer(s) may comprise one or more additive(s) conventionally employed in the manufacture of polymer films. Thus, agents such as cross-linking agents, dyes, fillers, pigments, lubricants, radical scavengers, thermal stabilisers, anti-oxidants, UV-stabilisers, hydrolysis stabilisers, flame retardants and inhibitors, anti-blocking agents, surface active agents, slip aids, gloss improvers, prodegradents, viscosity modifiers and dispersion stabilisers may be incorporated as appropriate. Such components may be introduced into the polymer in a conventional manner. For example, by mixing with the monomeric reactants from which the film-forming polymer is derived, or the components may be mixed with the polymer by tumble or dry blending or by compounding in an extruder, followed by cooling and, usually, comminution into granules or chips. Masterbatching technology may also be employed.

In particular, a layer may comprise one or more UV-stabiliser(s), particularly when the multi-layer film is intended for use in exterior applications. A UV-stabiliser is particularly advantageous in an outer layer, and particularly a layer which in use is exposed to the atmosphere (i.e. is disposed on or forms an external surface of a screen or the electronic device containing it). Typically, the UV-stabiliser is an organic UV-stabiliser, for instance the organic UV-stabilisers disclosed in WO-2012/123699-A the disclosure of which is incorporated herein by reference. A preferred class of UV-stabiliser is the hydroxyphenyltriazines, and particularly hydroxyphenyltriazine compounds of formula (II):

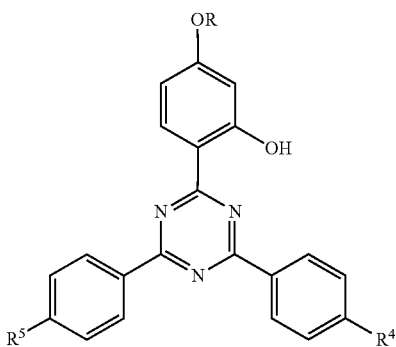

(II)

wherein, in the context of formula (II), R is hydrogen, $C_1$-$C_{18}$ alkyl, $C_2$-$C_6$ alkyl substituted by halogen or by $C_1$-$C_{12}$ alkoxy, or is benzyl and $R^4$ and $R^5$ are independently selected from hydrogen, alkyl, alkoxy or phenyl. R is preferably $C_1$-$C_{12}$ alkyl or benzyl, more preferably $C_3$-$C_6$ alkyl, and particularly hexyl. $R^4$ and $R^5$ are preferably hydrogen. An especially preferred UV-stabiliser is 2-(4,6-diphenyl-1,3,5-triazin-2-yl)-5-(hexyl)oxy-phenol, which is commercially available as Tinuvin™ 1577 from BASF, and which is a compound of formula (II) above, wherein R is $C_6H_{13}$ and $R^4$ and $R^5$ are both H. A further especially preferred UV-stabiliser is a 2-(2'-hydroxyphenyl)-4,6-diphenyl triazine which is commercially available as Tinuvin™ 1600 from BASF, and which is a triazine of formula (II) above, wherein R is $CH_2CH(C_2H_5)C_4H_9$, $R^4$ is phenyl and $R^5$ is hydrogen.

The amount of UV-stabiliser is preferably in the range from 0.1% to 10%, more preferably 0.2% to 7%, more preferably 0.6% to 4%, particularly 0.8% to 2%, and especially 0.9% to 1.2% by weight, relative to the total weight of the layer.

The presence of one or more anti-oxidant(s) in a layer, particularly an outer layer, may also be particularly advantageous. The base layer preferably does not comprise an antioxidant. Suitable antioxidants include hindered phenols, secondary aromatic amines and hindered amines, such as Tinuvin™ 770 (Ciba-Geigy), as disclosed in WO-2012/123699-A the disclosure of which is incorporated herein by reference. The concentration of antioxidant present in a layer is preferably in the range from 50 ppm to 5000 ppm of the polymer of the layer, more preferably in the range from 300 ppm to 1500 ppm, particularly in the range from 400 ppm to 1200 ppm, and especially in the range from 450 ppm to 600 ppm.

A layer, particularly an outer layer, and particularly a layer which in use is exposed to the atmosphere (i.e. is disposed on or forms an external surface of a screen or the electronic device containing it), may comprise one or more hydrolysis stabiliser(s). The base layer preferably does not comprise a hydrolysis stabiliser. Any hydrolysis stabiliser conventional in the art may be used. A preferred hydrolysis stabiliser is a glycidyl ester of a branched monocarboxylic acid, wherein the monocarboxylic acid has from 5 to 50 carbon atoms, and wherein said glycidyl ester is present in the form of its reaction product with at least some of the end groups of the polymer. Such compounds are disclosed in WO-2011/030098-A, the disclosure of which is incorporated herein by reference. The total amount of hydrolysis stabiliser present in a layer is preferably in the range of from about 0.10 to about 5.0 mol %, more preferably from about 0.20 to about 2.5 mol %, more preferably from about 0.25 to about 1.5 mol %, more preferably from about 0.35 to about 1.0 mol %, based on the amount of the polymer of the layer. Preferred glycidyl esters are those having the formula (I):

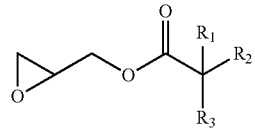

(I)

wherein, in the context of formula (I):
$R^1$ and $R^2$ are independently selected from alkyl,
$R^3$ is selected from hydrogen and alkyl, and preferably from alkyl; and
wherein the total number of carbon atoms in the groups $R^1$, $R^2$ and $R^3$ is from 3 to 48, preferably from 3 to 23, preferably from 3 to 13, preferably from 6 to 10, preferably from 7 to 9, and preferably 8.

In the context of formula (I), preferably at least one of $R^1$ and $R^2$ is methyl. More preferably, $R^1$ is methyl and $R^2$ is an alkyl group comprising at least 2 carbon atoms.

Where a mixture of glycidyl esters is used in a given layer of the film, each of the glycidyl esters is independently selected according to formula (I), and preferably such that the total number of carbon atoms in the alkyl groups $R^1$, $R^2$ and $R^3$ in each glycidyl ester of the mixture is the same.

In the context of formula (I), preferably $R^1$ is methyl, and $R^2$ and $R^3$ are independently selected from alkyl groups such that the total number of carbon atoms in $R^2$ and $R^3$ is from 2 to 47, preferably from 2 to 22, preferably from 2 to 12, preferably from 5 to 9, preferably from 6 to 8, and in one embodiment the total number of carbon atoms in $R^2$ and $R^3$ is 7. In further embodiments, a mixture of these preferred glycidyl esters is used, preferably such that the total number of carbon atoms in the alkyl groups $R^1$, $R^2$ and $R^3$ in each component of the mixture is the same.

As used herein, the term "alkyl" preferably refers to an unsubstituted straight-chain acyclic hydrocarbon group of formula $[-C_nH_{2n+1}]$.

A layer, particularly an outer layer, may comprise a particulate filler, which can improve handling and windability during manufacture. The base layer preferably does not comprise a filler. A particulate filler (if present) is typically a particulate inorganic filler (e.g. metal or metalloid oxides, such as alumina, titania, talc and silica (especially precipitated or diatomaceous silica and silica gels), calcined china clay and alkaline metal salts, such as the carbonates and sulphates of calcium and barium). A particulate inorganic filler is preferably finely-divided, and the volume distributed median particle diameter (equivalent spherical diameter corresponding to 50% of the volume of all the particles, read on the cumulative distribution curve relating volume % to the diameter of the particles—often referred to as the "D(v, 0.5)" value) thereof is preferably in the range from 0.01 to 5 μm, more preferably 0.05 to 1.5 μm, and particularly 0.15 to 1.2 μm. Preferably at least 90%, more preferably at least 95% by volume of the inorganic filler particles are within the range of the volume distributed median particle diameter ±0.8 μm, and particularly ±0.5 μm. Particle size of the filler particles may be measured by electron microscope, coulter counter, sedimentation analysis and static or dynamic light scattering. Techniques based on laser light diffraction are preferred.

Preferably, the co-extruded polyester film described herein is optically clear, since the intended end-use of the film as described herein demands transparency and good aesthetic appearance. As used herein, the term "optically clear" preferably means a % of scattered visible light (haze) of no more than 4.0%, preferably no more than 3.5%, preferably no more than 3.0, more preferably no more than 2.5%, more preferably no more than 2.0%, and particularly no more than 1.5%, and/or a total luminous transmission (TLT) for light in the visible region (400 nm to 700 nm) of at least 80%, preferably at least 85%, more preferably at least about 88%, preferably at least about 90%. In this embodiment, a filler may be present in an outer layer but, if present, is contained in only small amounts, generally not exceeding 0.5% and preferably less than 0.2% by weight of a layer, and in such embodiments the filler (if present) is preferably silica. It is known that the incorporation of such small amounts of filler in an outer layer improves the windability of the film (i.e. the absence of blocking or sticking when the film is wound up into a roll), without an unacceptable reduction in haze or other optical properties. In an alternative embodiment, acceptable windability characteristics may be provided by an optically clear coating on one of both surfaces of the film. Preferably, one or both, and preferably both, of the outer layers do not contain a particulate filler, i.e. the layers are preferably unfilled. In the preferred thermoformable films of the present invention, neither the base layer nor the outer layers contain a particulate filler, i.e. the layers are preferably unfilled.

The total thickness of the film is preferably in the range from 25 to 400 μm, more preferably at least 50 μm, more preferably at least 75 μm, more preferably at least 100 μm, and preferably no more than 350 μm, preferably no more than 300 μm, more preferably in the range of from about 100 to 300 μm, particularly 150 to 250 μm.

The thickness of each of the first and second outer layers (A1) and (A2) is preferably no more than about 25 μm, preferably no more than about 15 μm, preferably no more than about 10 μm, preferably no more than about 8 μm, preferably no more than about 5 μm, and preferably at least about 0.5 μm, preferably at least about 1 μm, preferably at least about 2 μm, preferably at least about 3 μm, and preferably in the range of from about 1 to about 10 μm, preferably from about 3 to about 8 μm.

The thickness of copolyester base layer is greater than the thickness of each of the first and second outer layers (A1) and (A2). The thickness of the copolyester base layer is preferably at least 90%, more preferably at least 92%, preferably at least 95%, and preferably no more than about 98%, and preferably in the range of from about 92% to about 98% of the total thickness of the film.

In the biaxially oriented coextruded film disclosed herein, said outer layers are preferably disposed directly on opposite surfaces of a single base layer. Preferably, the coextruded film itself consists of three layers, namely said base layer and said two outer layers, i.e. only three layers are formed by the co-extrusion process. The outer layers A1 and A2 may be the same or different, and are preferably the same, i.e. a symmetrical film is preferred. Thus, the coextruded film preferably exhibits an ABA layer structure.

Preferably, there is disposed on one or both of the outer layer(s) (A1 and/or A2) of the coextruded polyester film a functional layer selected from adhesion-promoting layers and ink-receptive layers, such that the adhesion of the outer layer(s) to a subsequently applied layer or ink is improved. Suitable such functional layers are well-known in the art. In the following discussion, the outer layer of the coextruded polyester film which faces outwardly when said film is disposed in an electronic device (i.e. towards the exterior of the electronic device) is referred to as outer layer A1, and the outer layer of the coextruded polyester film which faces inwardly when said film is disposed in an electronic device (i.e. towards the interior of the electronic device and towards the electronic components thereof) is referred to as outer layer A2.

The subsequently applied layer may be a graphics layer, and such a layer is preferably applied to the outer layer (A2) which is disposed facing inwardly in an electronic device. A graphics layer may be imparted by means of traditional printing processes such as off-set, gravure, silk screen, flexographic printing, thermal transfer printing (TTP) or laser transfer printing (LTP). Any suitable ink may be used, including solvent-based inks, and electro-conductive inks are of particularly utility. As used herein, the term "graphics layer" refers to pictorial and alpha-numeric information.

The subsequently applied layer may be a hard-coat or other protective layer, and such a layer is preferably applied to the outer layer (A1) which is disposed facing outwardly in an electronic device. Hard-coats and protective layers are well-known in the art.

A suitable adhesion-promoting layer (particularly suitable for promoting adhesion to a hard-coat or protective layer) comprises an acrylic resin. As used herein, the term "acrylic resin" refers to a resin which comprises at least one acrylic and/or methacrylic component. The acrylic resin is suitably thermoset.

Suitable acrylic resins preferably comprise at least one monomer derived from an ester of acrylic acid and/or an ester of methacrylic acid, and/or derivatives thereof. Preferably, the acrylic resin comprises greater than 50 mole %, preferably less than 98 mole %, more preferably in the range from 60 to 97 mole %, particularly 70 to 96 mole %, and especially 80 to 94 mole % of at least one monomer derived from an ester of acrylic acid and/or an ester of methacrylic acid, and/or derivatives thereof. A preferred acrylic resin comprises an alkyl ester of acrylic and/or methacrylic acid where the alkyl group contains up to ten carbon atoms such as methyl, ethyl, n-propyl, isopropyl, n-butyl, isobutyl, terbutyl, hexyl, 2-ethylhexyl, heptyl, and n-octyl. Preferably, the acrylic resin comprises an alkyl acrylate (preferably an ethyl acrylate and/or butyl acrylate) and an alkyl methacrylate (preferably methyl methacrylate), and preferably the acrylic resin comprises ethyl acrylate and methyl methacrylate. The acrylate monomer is preferably present in a proportion in the range from 20 to 80 mole % (preferably 30 to 65 mole %), and the methacrylate monomer is preferably present in a proportion in the range from 20 to 80 mole % (preferably from 20 to 60 mole %).

Other monomers which are suitable for use in the preparation of the acrylic resin, which are preferably copolymerised as optional additional monomers together with said esters of acrylic acid and/or methacrylic acid and/or derivatives thereof, include acrylonitrile, methacrylonitrile, halo-substituted acrylonitrile, halo-substituted methacrylonitrile, acrylamide, methacrylamide, N-methylol acrylamide, N-ethanol acrylamide, N-propanol acrylamide, N-methacrylamide, N-ethanol methacrylamide, N-methyl acrylamide, N-tertiary butyl acrylamide, hydroxyethyl methacrylate, glycidyl acrylate, glycidyl methacrylate, dimethylamino ethyl methacrylate, itaconic acid, itaconic anhydride and half esters of itaconic acid. Other optional monomers include vinyl esters such as vinyl acetate, vinyl chloroacetate and vinyl benzoate, vinyl pyridine, vinyl chloride, vinylidene chloride, maleic acid, maleic anhydride, styrene and derivatives of styrene such as chloro styrene, hydroxy styrene and alkylated styrenes, wherein the alkyl group contains from one to ten carbon atoms.

A preferred acrylic resin is derived from three monomers and comprises 35 to 60 mole % (preferably 40 to 50 mole %) of ethyl acrylate, 30 to 55 mole % (preferably 40 to 50 mole %) of methyl methacrylate, and 2 to 20 mole % (preferably 5 to 10 mol %) of acrylamide or methacrylamide, and preferably comprises approximate molar proportions 46/46/8% respectively of ethyl acrylate/methyl methacrylate/acrylamide or methacrylamide. Preferably, the polymer is thermoset, for example in the presence of about 25 weight % of a methylated melamine-formaldehyde resin.

A further preferred acrylic resin is derived from four monomers and comprises a copolymer comprising comonomers (a) 35 to 40 mole % alkyl acrylate, (b) 35 to 40 mole % alkyl methacrylate, (c) 10 to 15 mole % of a monomer containing a free carboxyl group, and (d) 15 to 20 mole % of a monomer containing a sulphonic acid group and/or a salt thereof. Ethyl acrylate is a particularly preferred monomer (a) and methyl methacrylate is a particularly preferred monomer (b). Monomer (c) containing a free carboxyl group (i.e. a carboxyl group other than those involved in the polymerisation reaction by which the copolymer is formed) suitably comprises a copolymerisable unsaturated carboxylic acid, and is preferably selected from acrylic acid, methacrylic acid, maleic acid, and/or itaconic acid (and preferably from acrylic acid and itaconic acid). The sulphonic acid group monomer (d) may be present as the free acid and/or a salt thereof, for example as the ammonium, substituted ammonium, or an alkali metal, such as lithium, sodium or potassium, salt. The sulphonate group does not participate in the polymerisation reaction by which the copolymer resin is formed. The sulphonic acid group monomer is preferably aromatic, and more preferably is p-styrene sulphonic acid and/or a salt thereof.

The weight average molecular weight ($M_w$; measured as described herein) of the acrylic resin can vary over a wide range but is preferably in the range from 10,000 to 1,000,000, and more preferably 50,000 to 200,000.

The acrylic resin component preferably comprises at least 30%, more preferably in the range from 40 to 99%, particularly 50 to 85%, and especially 70 to 80% by weight relative to the total weight of the layer. The acrylic resin is preferably the major component of said layer.

The composition from which the acrylic resin layer is derived suitably also contains a cross-linking agent. The cross-linking agent functions to improve adhesion to the polyester outer layer. The cross-linking agent should also function to internally cross-link the acrylic resin layer to provide solvent resistance. Suitable cross-linking agents comprise epoxy resins, alkyd resins, amine derivatives such as hexamethoxymethyl melamine, and/or condensation products of an amine, e.g. melamine, diazine, urea, cyclic ethylene urea, cyclic propylene urea, thiourea, cyclic ethylene thiourea, alkyl melamines, aryl melamines, benzo guanamines, guanamines, alkyl guanamines and aryl guanamines, with an aldehyde, e.g. formaldehyde. A useful condensation product is that of melamine with formaldehyde. The condensation product is optionally alkoxylated. The cross-linking agent may suitably be used in amounts of up to 70%, preferably in the range from 1 to 60%, more preferably 15 to 50%, and especially 20 to 30% by weight relative to the total weight of the layer. A catalyst is preferably employed to facilitate cross-linking action of the cross-linking agent. Preferred catalysts for cross-linking melamine formaldehyde include para toluene sulphonic acid, maleic acid stabilised by reaction with a base, morpholinium paratoluene sulphonate, and ammonium nitrate.

The composition from which the acrylic resin layer is derived optionally contains a plasticizer to aid film formation and handling. Any suitable plasticizer may be used, for instance phthalate esters such as alkyl benzyl phthalates, dialkyl adipate and m.p-cresol propoxylate.

The composition from which the adhesion-promoting layer (preferably the afore-mentioned acrylic resin) is derived is generally water-insoluble. Typically, such a composition is applied to the polyester outer layer as a coating composition in the form of an aqueous dispersion.

The composition from which the adhesion-promoting layer (preferably the afore-mentioned acrylic resin) is derived may be applied to the polyester outer layer, typically in the form of a coating composition, before, during or after the stretching operation in the production of an oriented film.

The coating composition is preferably applied to a polyester outer layer between the two stages (longitudinal and transverse) of a biaxial stretching operation. The coated film is heated (for instance, in the heat-setting stage as described hereinabove) in order to drive off the diluent of the composition (normally water, although organic solvent(s) can be used additionally or alternatively), and to assist in coalescing and forming the coating into a continuous and uniform layer, as well as facilitating cross-linking of cross-linkable coating compositions. Any suitable conventional coating technique such as dip coating, bead coating, reverse roller coating or slot coating may be used. The coating composition is preferably applied to the polyester base layer at a dry coat weight in the range from about 0.05 to 5 mg/dm$^2$, especially 0.1 to 2.0 mg/dm$^2$.

An ink-receptive layer is preferably a polyurethane coating. Preferably, the polyurethane is water-dispersible. Suitable polyurethanes are available as NeoRez® (from DSM); Dispurez® (from Incorez); Bayhydrol® (from BASF); Hauthane® (from Hauthaway); Witcobond® (from Chemtura (Lanxess)); Alberdingk® (from Alberdingk Boley); Takelac® (from Mitsui Chemicals); Solucote® (from Fitz Chem) and Cydrothane® (from Cytec (Solvay)). The coating techniques described above for the adhesion-promoting layer apply equally for the ink-receptive layer. The coating composition is preferably an aqueous composition, such as an aqueous dispersion. A cross-linking agent may be incorporated into the composition, for instance the cross-linking agents described hereinabove.

The thickness of a functional layer as hereinbefore described (particularly said adhesion-promoting or ink-receptive layer) is preferably no more than 1.5 µm, more preferably in the range of from 0.01 to 1.0 µm, and particularly 0.02 to 0.5 µm.

The thermoformable biaxially oriented coextruded film described herein exhibits excellent mechanical strength.

Preferably the coextruded film exhibits an Ultimate Tensile Strength (UTS) in each of the longitudinal and transverse directions of the film of at least 10.0 kgf/mm$^2$, preferably at least 11.0 kgf/mm$^2$, preferably at least 12.0 kgf/mm$^2$, preferably at least 13.0 kgf/mm$^2$, preferably at least 13.5 kgf/mm$^2$, preferably at least 14.0 kgf/mm$^2$.

Preferably the coextruded film exhibits an Elongation To Break (ETB) in each of the longitudinal and transverse directions of the film of at least 150%, preferably at least 160%, preferably at least 170%, preferably at least 180%.

Preferably the coextruded film exhibits an F5 value (stress at 5% elongation) in each of the longitudinal and transverse directions of the film of at least 8.0 kgf/mm$^2$, preferably at least 8.2 kgf/mm$^2$, preferably at least 8.4 kgf/mm$^2$, preferably at least 8.6 kgf/mm², preferably at least 8.8 kgf/mm², preferably at least 9.0 kgf/mm².

The co-extruded polyester film described herein preferably exhibits a low shrinkage. Preferably the shrinkage at 150° C. for minutes is no more than 3.0%, preferably no more than 2.5%, preferably no more than 2.0%, preferably no more than 1.5% in the machine (longitudinal) dimension (MD) of the film, and preferably no more than 3.0%, preferably, preferably no more than 2.5%, preferably no more than 2.0%, preferably no more than 1.5%, preferably no more than 1.0% in the transverse dimension (TD) of the film. Preferably the shrinkage at 190° C. for 5 minutes is preferably no more than 5.0%, preferably no more than 4.5%, preferably no more than 4.0%, preferably no more than 3.5% in the machine (longitudinal) dimension of the film, and preferably no more than 5.0%, preferably no more than 4.5%, preferably no more than 4.0%, preferably no more than 3.5%, preferably no more than 3.0%, preferably no more than 2.5%, preferably no more than 2.0%, preferably no more than 1.5%, preferably no more than 1.0% in the transverse dimension of the film. Preferably, the shrinkage in the transverse dimension of the film is lower than the shrinkage in the machine dimension of the film. Thus, preferably the shrinkage at 190° C. for 5 minutes is preferably no more than 2.5%, preferably no more than 2.0%, preferably no more than 1.5%, preferably no more than 1.0% in the transverse dimension of the film.

It will be appreciated that the terms "longitudinal direction" and "transverse direction" of the film refer to the directions in which a film was stretched during its manufacture. The term "machine direction" is also used herein to refer to the longitudinal direction.

The coextruded film described herein exhibits excellent thermoformability. The thermoforming process comprises heating a film to a temperature above the Tg of the material but below the crystalline melting temperature of the material (if it has any crystallinity), and then applying a deforming force to the material while it is in its softened, rubbery, solid state. The film is then cooled to a temperature below its Tg, whereupon it must retain the deformation that was introduced while it was in the softened rubbery state. Thus, thermoformability requires that the cooled and deformed film retains the deformed shape after such a thermoforming process.

An assessment of the thermoformability of a film may include the assessment of the quality of the finished thermoformed film, and particularly the accuracy of the reproduction of the designated tooling, and particularly the reproduction of sharp 90° edges. Thus, polycarbonate films are known to exhibit excellent thermoformability and produce accurate shape formation around the designated tooling, with the capability to reproduce sharp 90° edges. In contrast, while conventional polyester films are capable of thermoforming, they do not have the capability for higher degrees of deformation (known as "draw"), and fail to reproduce sharp 90° edges (instead forming rounded edges) as well as exhibiting cracking and/or hole formation and/or stress-induced whitening during the thermoforming process. Conventional polyester films are thus suitable only for shallow draw applications, and particularly applications with less aggressive tooling (i.e. which do not require the reproduction of sharp 90° edges). As used herein, the terms "shallow draw", "medium draw" and "deep draw" refer to deformation of less than 5 mm out of the plane of the flat film, deformation of from about 5 to 10 mm out of the plane of the flat film, and deformation of greater than 10 mm out of the plane of the flat film, respectively, around a part.

Thermoformability is indicated by the stress-strain curve above the glass transition temperature of the material (see, for instance, "Thermoforming" by James L. Throne (Pub. Karl Heuser Verlag, Munich 1987; ISBN 3-446-14699-7). A thermoformable polymeric film is characterised by a relatively low force required to stretch a film above its Tg and a relatively high extent of stretching, when compared with a standard polymeric film. Assessment of thermoformability is preferably achieved by measuring one or more of the Young's modulus, the yield stress and the post-yield modulus, particularly the yield stress and the post-yield modulus, of the film at temperatures above Tg, as described hereinbelow. Measurement of these parameters at various temperatures above Tg provides a general indication of the thermoformability of the film, but the stress-strain behaviour is essentially critical only at the temperature of the thermoforming process, which depends on such factors as the identity and thickness of the film, the degree of deformation (or "draw") required, and the magnitude and rate of the deformation strain applied. More fundamentally, thermoformability requires that the deformed film retains the deformed shape, once cooled, as noted above. Accordingly, the important characteristic of a thermoformable film is therefore the relaxation of induced stress at the processing temperature after stretching the film to the desired strain. The characteristic is usually expressed as a percentage of stress retained after a defined time period (in seconds), or as the time required to relax stress by a defined percentage, and in a thermoformable film the values of these parameters should be as low as possible, as is well known in the art (see for instance "Viscoelastic Properties of Polymers"; John D. Ferry, page 8 et seq., 3rd Ed, Wiley, NY; ISBN 0-471-04894-1; and "Mechanical Properties of Solid Polymers", I. M. Ward, 2nd Ed., John Wiley)).

In the thermoformable films of the present invention, the elongation (strain) at break (ETB) should be greater than the strains experienced during the thermoforming operation, and/or the tensile strength at maximum elongation (UTS) should be greater than the yield stress. Preferably, the thermoformable films disclosed herein exhibit an elongation (strain) at break when measured at 130° C. which is greater than 220% in both machine (MD) and transverse (TD) directions.

The polyester films disclosed herein may also be assessed for thermoformability by comparison to a standard polycarbonate film and/or a standard unfilled PET film. Such assessment is suitably conducted via optical light microscopy analysis. The assessment is preferably conducted using a "medium draw" around a part. Preferably, the assessment may also be conducted using a "deep draw" around a part.

The coextruded film described herein is preferably thermoformable at a temperature in the range of from about 130° C. to about 200° C., preferably at least about 135° C., preferably at least about 140° C., preferably at least about 150° C., preferably no higher than about 195° C., preferably from about 160° C. to about 190° C., more preferably from about 160° C. to about 180° C.

In the coextruded film described herein, the morphology of the copolyester base layer is preferably different from that of the outer PET layers. Advantageously, the copolyester base layer exhibits a degree of crystallinity which is lower than that of either of the PET outer layers. Preferably, the copolyester base layer exhibits a degree of crystallinity $(X_{C-BASE})$ which is at least 40% lower, preferably at least 45% lower, than the degree of crystallinity $(X_{C-OUTER})$ of the outer layers. In other words, $(X_{C-OUTER})-(X_{C-BASE})/(X_{C-OUTER})\times 100 \geq 40\%$, preferably 45%. Preferably, $(X_{C\text{-}OUTER}) - (X_{C\text{-}BASE})/(X_{C\text{-}OUTER}) \times 100$ is no more than about 70%, preferably no more than about 60%, preferably no more than about 55%, preferably no more than about 50%. The degree of crystallinity of each layer is calculated from the enthalpy of fusion as measured by Differential Scanning Calorimetry (DSC).

Preferably, the degree of crystallinity ($X_{C\text{-}OUTER}$) of each of the outer layers is, independently, at least about 25%, preferably at least about 28%, preferably at least about 30%, and preferably no more than about 50%, typically no more than about 45%, more typically no more than about 40%, and more typically no more than about 35%.

Preferably, the degree of crystallinity ($X_{C\text{-}BASE}$) of the copolyester base layer is less than 25%, preferably no more than about 20%, preferably no more than about 18%, and preferably no more than about 17%, typically no more than about 16%, preferably at least about 5%, more preferably at least about 10%.

The film described hereinabove is of particular utility as a screen in an electronic device, particularly a touch-screen, particularly a capacitive touch-screen. As noted above, such screens find utility in the automotive, domestic appliance and consumer electronics markets. In general, the utility of the films extends beyond screens and may include automotive and industrial instrument panels, displays, domestic appliance fascias, medical device fascias, consumer electronics body parts, and automotive interior decoration.

According to a third aspect of the invention, there is provided an electronic device comprising a touch-screen interface wherein the external surface of said touch-screen interface is a thermoformed biaxially oriented coextruded polyester film comprising a copolyester base layer B, a first polyester outer layer A1 and a second polyester outer layer A2, wherein said outer layers are disposed on opposite surfaces of said base layer, and wherein:
  (i) said base layer B comprises a copolyester derived from terephthalic acid (TA) and a second aromatic dicarboxylic acid and one or more diol(s), wherein said second aromatic dicarboxylic acid is present in the copolyester in an amount of from about 5 to about 20 mol % of the acid fraction of the copolyester;
  (ii) the polyester of each of said outer layers A1 and A2 is selected from polyethylene terephthalate (PET); and
  (iii) the thickness of the base layer constitutes at least 90% of the total thickness of the coextruded multi-layer polyester film.

The thermoformed biaxially oriented coextruded polyester film in the electronic device is produced by thermoforming a thermoformable biaxially oriented coextruded polyester film as described hereinabove. Preferably, the thermoforming is conducted at a film temperature in the range of from about 130° C. to about 200° C., preferably at least about 135° C., preferably at least about 140° C., preferably at least about 150° C., preferably no higher than 195° C., preferably from about 160° C. to about 190° C., more preferably from about 160° C. to about 180° C.

Preferably the thermoforming is conducted by pre-heating the film for a period of from about 1 to about 15 seconds, and then thermoforming at elevated pressure, preferably from about 20 to about 150 bar (preferably no higher than about 120 bar, preferably no higher than about 110 bar, preferably from about 30 to about 100 bar), preferably for a period of from about 1 to about 15 seconds. The elevated pressure required for the thermoforming step is preferably provided by high pressure air. The heating of the film may be effected by contact heating or by using heated air.

In one preferred embodiment, the film is forced against a heated platen by high-pressure air (preferably in the range of 3 to 5 bar) and pre-heated (preferably for a period of about 1 to about 15 seconds, typically from about 2 to about 4 seconds), followed by the application of the forming pressure (preferably about 35 bar) to thermoform the film around the moulding tool.

In a further preferred embodiment, pre-heating occurs in a chamber which is separate from the chamber where the film is formed into the desired shape. Thus, after pre-heating the film in a pre-heat chamber (preferably for a period of about 1 to about 15 seconds), the film is passed into a forming chamber where the forming mould closes and air pressure is applied. Forming is carried out by pushing high pressure, heated air (up to 150 bar, preferably no higher than about 120 bar, preferably no higher than about 110 bar, and typically around 100 bar) against one side of the film to force it over the forming tool.

Preferably, the process for forming a moulded part comprises the following steps:
  (1) Optionally printing the film with a graphics layer
  (2) Optionally functionalising the film by disposing on the film surface any electronic circuitry required for the end-use, particularly printed electronic circuitry;
  (3) Thermoforming the (optionally printed and/or functionalised) film;
  (4) Cutting the thermoformed film to its desired shape prior to injection moulding; and
  (5) Providing the moulded part via an injection moulding process, preferably by placing the thermoformed film into the mould of an injection moulding machine and backfilling with a moulding resin.

In the injection moulding step, the moulding resin may be any polymeric resin suitable for use in injection moulding, for instance, polycarbonate, acrylonitrile butadiene styrene (ABS) or polyester, and is preferably polycarbonate or polycarbonate/ABS. Injection moulding normally takes place in a machine which is separate and different from the thermoforming machine. In the finished moulded part, the printed graphics layer is preferably encapsulated between the film and the moulding resin.

The thermoformed biaxially oriented coextruded polyester film is preferably oriented in the electronic device such that said first polyester outer layer A1 is disposed facing outwardly in the device and said second polyester outer layer A2 is disposed facing inwardly in the device. Preferably, the second polyester outer layer A2 has a first and second surface such that said first surface is adjacent the base layer B and said second surface has disposed thereon a graphics layer, preferably wherein an adhesion-promoting or ink-receptive layer is disposed on the second surface of the second polyester outer layer A2 prior to application of the graphics layer, as described hereinabove. Preferably, the first polyester outer layer A1 has a first and second surface such that said first surface is adjacent the base layer B and said second surface has disposed thereon a hard-coat or protective layer, preferably wherein an adhesion-promoting layer is disposed on the second surface of the first polyester outer layer A1 prior to application of the hard-coat or protective layer, as described hereinabove.

The touch-screen interface is preferably in the form of an injection-moulded module comprising said touch-screen interface. The injection-moulded module suitably comprises an internal portion or layer of injection-moulded polymeric material, and an outer portion or layer of said thermoformed biaxially oriented coextruded polyester film.

The injection-moulding may be conducted using any conventional injection-moulding technique known in the art, and using any suitable thermoplastic or thermosetting polymeric material. Polycarbonate is one example of an injection-moulding material suitable for use in the present invention.

The touch-screen is preferably a capacitive touch-screen, and such screens are widely known and used in the art. The capacitive touch screen is preferably associated with a transparent conductive layer, such as indium tin oxide. As described above, any electronic circuitry and conductive inks are preferably disposed on the surface of the coextruded polyester film of the present invention. Thus, electronic circuitry is suitably located between the thermoformed polyester film and the back-filled injection-moulded material.

According to a fourth aspect of the invention, there is provided the use of the biaxially oriented coextruded polyester film described herein as a thermoformable film, particularly in the manufacture of an electronic device comprising a touch-screen interface wherein the external surface of said touch-screen interface is a thermoformed biaxially oriented coextruded polyester film produced by thermoforming said thermoformable biaxially oriented coextruded polyester film.

According to a fifth aspect of the invention, there is provided a method of manufacture of an electronic device comprising a touch-screen interface, said method comprising the steps of:
(i) thermoforming a thermoformable biaxially oriented coextruded polyester film as described herein to produce a thermoformed biaxially oriented coextruded polyester film, and
(ii) providing said thermoformed biaxially oriented coextruded polyester film as a part of said touch-screen interface in the electronic device.

In the method of manufacture of the fifth aspect, said thermoformed biaxially oriented coextruded polyester film is provided as a part of said touch-screen interface by forming an injection-moulded module comprising said touch-screen interface, such that the injection-moulded module comprises an internal portion or layer of injection-moulded polymeric material, and an outer portion or layer of said thermoformed biaxially oriented coextruded polyester film, and providing said injection-moulded module as a part of the electronic device.

The preferences disclosed hereinabove for the first, second and third aspects of the invention apply also to the fourth and fifth aspects.

Property Measurement

The following analyses were used to characterize the films described herein:
(i) Clarity may be evaluated by measuring total luminance transmission (TLT) and haze (% of scattered transmitted visible light) through the total thickness of the film using an M57D spherical hazemeter (Diffusion Systems) according to ASTM D1003.
(ii) Intrinsic viscosity (in units of dL/g) may be measured by solution viscometry in accordance with ASTM D5225-98(2003) on a Viscotek™ Y-501C Relative Viscometer (see, for instance, Hitchcock, Hammons & Yau in *American Laboratory* (August 1994) "The dual-capillary method for modern-day viscometry") by using a 0.5% by weight solution of polyester in o-chlorophenol at 25° C. and using the Billmeyer single-point method to calculate intrinsic viscosity:

$$\eta = 0.25\eta_{red} + 0.75(\ln \eta_{rel})/c$$

wherein:
$\eta$=the intrinsic viscosity (in dL/g),
$\eta_{rel}$=the relative viscosity,
c=the concentration (in g/dL), &
$\eta_{red}$=reduced viscosity (in dL/g), which is equivalent to $(\eta_{rel}-1)/c$ (also expressed as $\eta_{sp}/c$ where $\eta_{sp}$ is the specific viscosity).
(iii) Thermal shrinkage is assessed for film samples of dimensions 200 mm×mm which were cut in specific directions relative to the machine and transverse directions of the film and marked for visual measurement. The longer dimension of the sample (i.e. the 200 mm dimension) corresponds to the film direction for which shrinkage is being tested, i.e. for the assessment of shrinkage in the machine direction, the 200 mm dimension of the test sample is oriented along the machine direction of the film. After heating the specimen to the predetermined temperature (by placing in a heated oven at that temperature) and holding for the predetermined time interval, it was cooled to room temperature and its dimensions re-measured manually. The thermal shrinkage was calculated and expressed as a percentage of the original length.
(iv) Layer thickness is measured by Mercer 122D gauge.
(v) The Ultimate Tensile Strength (UTS), Elongation To Break (ETB) and the F5 value (stress at 5% elongation) are measured according to test method ASTM D882. Using a straight edge and a calibrated sample cutter (10 mm+\−0.5 mm) five strips (100 mm in length) of the film are cut along the machine direction. Each sample is tested using an Instron test machine, using pneumatic action grips with rubber jaw faces. The tests are conducted at ambient conditions. The crosshead speed (rate of separation) is 25 mm·min$^{-1}$. The strain rate is 50%. Elongation to Break ($\epsilon_B(\%)$) is defined as:

$$\epsilon_B(\%) = (\text{extension at break}/L_0) \times 100$$

where $L_0$ is the original length of the sample between grips.
(vi) Thermoformability may be assessed from the stress-strain curve above the glass transition temperature of the polymer, with reference to the parameters of Young's modulus, yield stress, and post-yield modulus.
The Young's modulus is a measure of the stiffness of a given material. It represents the rate of change of stress with strain and can be determined experimentally from the initial slope of the stress-strain curve during tensile testing. Thus, the Young's modulus is the ratio of the tensile strength to the elongation below the yield stress. Preferably, it is calculated as the highest ratio between 0 and 10% elongation.
The yield stress may be determined from the stress-strain curve exhibited during tensile testing and represents the stress at which permanent deformation of a stressed specimen begins to take place, i.e. the tensile stress above which the material elongates beyond recovery. Preferably, it is calculated as the stress at which the tensile to elongation ratio has decreased by 60% from its highest value (i.e. the Young modulus). Desirably, the yield stress should be as close to zero as possible at the processing temperature of the thermoforming process.
The post-yield modulus is a measure of strain hardening of a given material and is the slope of the stress-strain curve when a material is strained beyond the yield point. An increasing stress is required to produce additional deformation. Thus, the post-yield modulus coefficient is the ratio of the tensile strength to the elongation above the yield stress (and below the elongation at break). Preferably, it is calculated as the average ratio between an elongation (%) range from E1 to E2 where (i) 10≤(E2−E1)≤20; (ii) 60≤E2≤120; and (iii) 50≤E1≤100 (which range is typically between 60 and 80%, but in some cases between 40 and 60% or 50 and 60% or 100 and 120%, depending on the shape of the curve). Desirably, the post-yield modulus should be as close to zero as possible in the processing region of interest, i.e. the strain and temperature regions utilised in the thermoforming process.

The Young's modulus, the yield stress and the post-yield modulus coefficient are suitably measured at various temperatures: 25° C.; Tg; Tg+50° C.; and Tg+100° C. Using a straight edge and a calibrated sample cutter (10 mm±0.5 mm in the middle of the strip), five dog-bone shaped strips (500 mm in length) of the film are cut along the machine direction. The same procedure is repeated for the transverse direction. Each sample is tested using an Instron model 3111 materials test machine, using pneumatic action grips with rubber jaw faces and a hot box. The temperature is varied as required. The crosshead speed (rate of separation) is 25 mm·min$^{-1}$. The strain rate is 50%. The elongation is preferably measured by video-recording the distance between two black spots pre-marked on the strip.

(vii) Relaxation of the thermoformed film at elevated temperatures and/or humid conditions may be tested by accelerated ageing of the thermoformed film in an environmental oven at 85° C. and a relative humidity of 85% for 60 minutes or longer.

(viii) Glass transition temperature ($T_g$), crystalline melting point ($T_m$) and the degree of crystallinity ($X_c$) were measured by differential scanning calorimetry (DSC) using a Perkin Elmer Hyper 8500 DSC. Unless otherwise stated, measurements were made according to the following standard test method and based on the method described in ASTM E1356-98. The sample (5 mg) was maintained under an atmosphere of dry nitrogen for the duration of the scan.

The thermal properties of polymer/copolymer samples were examined via heat-cool-reheat scans, using the following method:

Equilibrate at −30° C. for 2 minutes
Heat from −30° C. to 300° C. at 20° C./minute (1st heating scan)
Equilibrate at 300° C. for 2 minutes
Cool from 300° C. to −30° C. at 20° C./minute (1st cooling scan)
Equilibrate at −30° C. for 2 minutes
Heat from −30° C. to 300° C. at 20° C./minute (2nd heating scan)

The value of Tg was determined as the extrapolated onset temperature of the glass transition observed on the DSC scan (heat flow (W/g) against temperature (° C.)), as described in ASTM E1356-98. The value of Tm was determined from the DSC scan as the peak of the transition from the second heating scan.

The thermal properties of film samples, in particular the degree of crystallinity, were examined via heating scan only, using the following method:

Equilibrate at 0° C. for 2 minutes
Heat from 0° C. to 300° C. at 20° C./minute

The degree of crystallinity ($X_c$) was calculated from the experimental enthalpy of fusion values (ΔHm) according to the equation:

$$X_c = \Delta H_m / \Delta H_m^\circ$$

wherein:

$\Delta H_m$=experimental enthalpy of fusion calculated from the integral of the melting endotherm;

$\Delta H_m^\circ$=theoretical enthalpy of fusion of the corresponding poly(alkylene-carboxylate) homopolymer (i.e. without any of the minor co-monomer) at 100% crystallinity. Thus, for the preferred PET-based copolyester of the base layer and the PET outer layers of the films of the present invention, $\Delta H_m^\circ$ is the theoretical enthalpy of fusion of a 100% crystalline PET polymer (140 J/g), as defined in the literature (B. Wunderlich, *Macromolecular Physics*, Academic Press, New York, (1976)).

The invention is further illustrated by the following examples. The examples are not intended to limit the invention as described above. Modification of detail may be made without departing from the scope of the invention.

EXAMPLES

Example 1

A multi-layer film comprising a base layer B of IPA-containing PET-based copolyester (molar ratio of IPA:TA:EG was 12:88:100; IV=0.67; unfilled) and two outer layers A1 and A2 of PET (IV=0.65; unfilled) was extruded and cast using a standard melt coextrusion system. The coextrusion system was assembled using two independently operated extruders which fed separate supplies of polymeric melt to a standard coextrusion block or junction at which these streams were joined. From the coextrusion block, the melt-streams were transported to a conventional, flat film extrusion die which allowed the melt curtain to be cast from the common coextrusion die at 275° C., and then quenched in temperature onto a rotating, chilled metal drum. The cast film was collected at a process speed of about 3.3 m/min and was approximately 635 mm in width. The cast extrudate was stretched in the direction of extrusion to approximately 3.2 times its original dimensions at a temperature of 78° C. The line speed was about 12 m/min. The cooled stretched film was then passed into a stenter oven at a temperature of 105° C. where the film was dried and stretched in the sideways direction to approximately 3.0 times its original dimensions. The biaxially stretched film was heat-set in a three-zone crystalliser at sequential temperatures of 210, 190 and 180° C., under dimensional relaxation in the transverse direction of about 8%. The average thickness of the final film was about 212 μm and comprised three layers having an ABA structure, wherein the average thickness of the outer layers (A1) and (A2) was about 6 μm.

The film was tested according to the methods described herein. The crystallinity (Xc) of the base layer was less than 20%. Other results are presented in Table 1 below.

Thermoforming was conducted on film samples of dimensions 610 mm×436 mm. The film sample was moulded at a range of platen temperature from 177 to 200° C. and over a range of pre-heat times from 2 to 12 seconds and using a pre-heat pressure of 5.5 bar (80 psi). The mould pressure was 34.4 bar (500 psi). The film performed excellently as a thermoformable film, with best results obtained at a platen temperature of 177 to 190° C. At a thermoforming temperature of 200° C., however, the thermoformed film shows signs of wrinkling and excessive shrinkage in some areas.

A further series of thermoforming tests using the film of Example 1 was conducted using a variety of thermoforming conditions. Thus, a film sample of dimensions 300×210 mm was heated for a range of pre-heat times from 10-16 seconds at a temperature of 260° C., resulting in a film temperature of 137-160° C., with the best results observed at a film temperature of 158° C. The film sample was moulded at pressures of 50-120 bar with a high pressure duration of 3-10 seconds. The film performed excellently as a thermoformable film. Best results were observed at high pressure duration towards the lower end of that range, and preferably about 3 seconds. With regard to the pressure, best results were observed at pressures of no more than about 110 bar, preferably at around 100 bar. At pressures of 120 bar, signs of whitening and cracking were observed in some parts.

A moulded part was produced from the thermoformed film generally as hereinbefore described. Thus, the thermoformed film was back-filled with polycarbonate resin using an Arburg 470C Allrounder 1500-350 injection moulding machine using a resin temperature of 290° C.

Example 2

A multi-layer film comprising a base layer B of IPA-containing PET-based copolyester (molar ratio of IPA:TA:EG was 12:88:100; IV=0.65; unfilled) and two outer layers A1 and A2 of PET (IV=0.65; unfilled) was extruded and cast using a standard melt coextrusion system, as described for Example 1. The cast film was collected at a process speed of about 3 m/min and was approximately 620 mm in width. The cast extrudate was stretched in the direction of extrusion to approximately 3.2 times its original dimensions at a temperature of 78° C. The line speed was 11 m/min. The cooled stretched film was then passed into a stenter oven at a temperature of 105° C. where the film was dried and stretched in the sideways direction to approximately 3.4 times its original dimensions. The biaxially stretched film was heat-set in a three-zone crystalliser at sequential temperatures of 210, 210 and 190° C., under dimensional relaxation in the transverse direction of about 3%. The average thickness of the final film was about 200 μm and comprised three layers having an ABA structure, wherein the average thickness of the outer layers (A1) and (A2) was about 5 μm. The film was tested according to the methods described herein and the results presented in Table 1 below.

Thermoforming was conducted on a film sample of dimensions 300×210 mm. The film sample was pre-heated for seconds at a temperature of 260° C., resulting in a film temperature of 158° C. The film sample was moulded at pressure of 100 bar with a high pressure duration of 3 seconds. The film performed excellently as a thermoformable film.

Following thermoforming, a moulded part was produced by back-filling with polycarbonate resin as described for Example 1.

A further sample of the film of Example 2 was printed with black inks, and then thermoformed under identical pre-heat temperatures/times/forming pressures as before, except that the film temperature was increased to 165° C. The film performed excellently as a thermoformable film.

A further sample of the film of Example 2 was thermoformed, using a film sample of dimensions 610 mm×436 mm. The film sample was moulded at a platen temperature of 177° C. at a pre-heat time of 3 seconds and using a pre-heat pressure of 5.5 bar (80 psi). The mould pressure was 34.4 bar (500 psi). The film performed excellently as a thermoformable film.

The film also exhibited excellent chemical resistance. In a 24 hour solvent test at room temperature using a variety of solvent systems, the film passed the test in respect of methylene chloride, isopropyl alcohol, cyclohexanone, ethyl acetate, concentrated HCl, acetone, xylene and toluene. In this test, a failure was constituted by any of a non-removable stain, cloudiness or blistering. Only in respect of 40% NaOH aqueous solution did the film exhibit any evidence of these features. In addition, the film was tested for chemical resistance to a variety of household agents (bleach; furniture polish; Windowlene®; suncream SPF30; mosquito spray (50% DEET); WD40 oil; Flash® floor cleaner; fabric conditioner; car wax cleaner; and antibacterial spray), at room temperature and at 50° C., and for 1 hour and 24 hours. In all instances, the film passed the test.

Example 3

A multi-layer film comprising a base layer B of IPA-containing PET-based copolyester (molar ratio of IPA:TA:EG was 12:88:100; IV=0.63) and two outer layers A1 and A2 of PET (IV=0.65; unfilled) was extruded and cast using a standard melt coextrusion system, as described for Example 1. The cast film was collected at a process speed of about 2.8 m/min and was approximately 710 mm in width. The cast extrudate was stretched in the direction of extrusion to approximately 3.2 times its original dimensions at a temperature of 78° C. The line speed was 9.5 m/min. The cooled stretched film was then passed into a stenter oven at a temperature of 105° C. where the film was dried and stretched in the sideways direction to approximately 3.7 times its original dimensions. The biaxially stretched film was heat-set in a three-zone crystalliser at sequential temperatures of 210, 210 and 190° C., under dimensional relaxation in the transverse direction of about 4%. The average thickness of the final film was about 185 μm and comprised three layers having an ABA structure, wherein the average thickness of the outer layers (A1) and (A2) was about 6 μm.

Thermoforming was conducted on a film sample of dimensions 210 mm×300 mm. The film sample was moulded at a platen temperature of 177° C. over with a pre-heat time of 3 seconds and using a pre-heat pressure of 5.5 bar (80 psi). The mould pressure was 34.4 bar (500 psi). The film performed excellently as a thermoformable film.

Comparative Example 1

A mono-layer, unfilled PET film (IV=0.65) was extruded and cast using a standard melt coextrusion system, as described for Example 1. The cast film was collected at a process speed of about 8 m/min and was approximately 800 mm in width. The cast extrudate was stretched in the direction of extrusion to approximately 3.4 times its original dimensions at a temperature of 82° C. The line speed was 27 m/min. The cooled stretched film was then passed into a stenter oven at a temperature of 125° C. where the film was dried and stretched in the sideways direction to approximately 3.8 times its original dimensions. The biaxially stretched film was heat-set in a four-zone crystalliser at sequential temperatures of 232, 232, 232 and 170° C., under dimensional relaxation in the transverse direction of about 2.4%. The average thickness of the final film was about 175 μm. The film was tested according to the methods described herein. The crystallinity was 31%. Other results are presented in Table 1 below.

Attempts at thermoforming several samples of this film were made, using a film sample of dimensions 610 mm×436 mm, and varying thermoforming conditions. The film sample was moulded at a platen temperature of 177° C. and at pre-heat times of from 2 to seconds and using a pre-heat pressure of 5.5 bar (80 psi). The mould pressure was 34.4 bar (500 psi). The film did not perform acceptably as a thermoformable film.

TABLE 1

| | Haze (%) | TLT (%) | Shrinkage @150° C. (%) | | Shrinkage @190° C. (%) | | Thermo-formable |
|---|---|---|---|---|---|---|---|
| | | | MD | TD | MD | TD | |
| Ex. 1 | 1.9 | 90.1 | 1.4 | −0.47 | 5.2 | 2.5 | Yes |
| Ex. 2 | 1.98 | 89.9 | 1.46 | 0.54 | 3.4 | 0.39 | Yes |
| Ex. 3 | 1.5 | 86.5 | 1.3 | −0.57 | 3.3 | −0.57 | Yes |
| C. Ex. 1 (PET) | 0.8 | 90.0 | 1.1 | 0.2 | 2.1 | 0.6 | No |
| Control 1 (PC) | 0.3 | 90.0 | — | — | — | — | Yes |

In Table 1 above, Control 1 is a 250 μm polycarbonate film.

The invention claimed is:

1. A thermoformable biaxially oriented coextruded polyester film comprising a copolyester base layer B, a first polyester outer layer A1 and a second polyester outer layer A2, wherein said outer layers are disposed on opposite surfaces of said base layer, and wherein:
   (i) said base layer B comprises a copolyester derived from terephthalic acid (TA) and a second aromatic dicarboxylic acid and one or more diol(s), wherein said second aromatic dicarboxylic acid is present in the copolyester in an amount of from about 5 to about 20 mol % of the acid fraction of the copolyester;
   (ii) the polyester of each of said outer layers A1 and A2 is polyethylene terephthalate (PET); and
   (iii) the thickness of the base layer constitutes at least 90% of the total thickness of the coextruded multi-layer polyester film;
   wherein the second aromatic dicarboxylic acid is isophthalic acid (IPA) and wherein the film exhibits a haze of no more than 4.0%.

2. The thermoformable biaxially oriented coextruded polyester film according to claim 1 wherein said second aromatic dicarboxylic acid is present in the copolyester in an amount of from about 8 to about 16 mol % of the acid fraction of the copolyester.

3. The thermoformable biaxially oriented coextruded polyester film according to claim 1, wherein said copolyester is derived from terephthalic acid, the second aromatic dicarboxylic acid and ethylene glycol.

4. The thermoformable biaxially oriented coextruded polyester film according to claim 1 wherein said copolyester of said base layer exhibits a crystalline melting point (Tm) in the range of 210 to 240° C. and which is at least 10° C. lower than the crystalline melting point of said outer layer polyester, and/or a glass transition temperature (Tg) in the range of 60 to 90° C.

5. The thermoformable biaxially oriented coextruded polyester film according to claim 1 wherein the total thickness of the film is from about 50 to about 350 μm.

6. The thermoformable biaxially oriented coextruded polyester film according to claim 1 wherein the film exhibits a shrinkage at 150° C. of no more than 3.0% in each of the machine and transverse dimensions of the film; and/or wherein the film exhibits a shrinkage at 190° C. of no more than 5.0% in each of the machine and transverse dimensions of the film.

7. The thermoformable biaxially oriented coextruded polyester film according to claim 1 which exhibits a haze of no more than 3.0% and/or a total light transmission (TLT) of at least 85%.

8. The thermoformable biaxially oriented coextruded polyester film according to claim 1 wherein the base layer does not contain a particulate filler, and preferably wherein the outer layers do not contain a particulate filler.

9. The thermoformable biaxially oriented coextruded polyester film according to claim 1 wherein the coextruded film exhibits an Ultimate Tensile Strength (UTS) in each of the longitudinal and transverse directions of the film of at least 10.0 kgf/mm$^2$, and/or an Elongation To Break (ETB) in each of the longitudinal and transverse directions of the film of at least 150%, and/or an F5 value (stress at 5% elongation) in each of the longitudinal and transverse directions of the film of at least 8.0 kgf/mm$^2$.

10. The thermoformable biaxially oriented coextruded polyester film according to claim 1 wherein a functional layer is disposed on one or both of the outer layer(s) A1 and/or A2 of the coextruded polyester film, wherein said functional layer is selected from adhesion-promoting layers and ink-receptive layers.

11. The thermoformable biaxially oriented coextruded polyester film according to claim 10 wherein the adhesion-promoting layer comprises an acrylic resin, and is disposed on the outer layer A1.

12. The thermoformable biaxially oriented coextruded polyester film according to claim 10 wherein a subsequently applied layer is a protective or hardcoat layer applied to the adhesion-promoting layer disposed on the outer layer A1.

13. The thermoformable biaxially oriented coextruded polyester film according to claim 10 wherein the ink-receptive layer comprises a polyurethane, and is disposed on the outer layer A2.

14. The thermoformable biaxially oriented coextruded polyester film according to claim 10 wherein a subsequently applied layer is a graphics layer applied to the ink-receptive layer disposed on the outer layer A2.

15. The thermoformable biaxially oriented coextruded polyester film according to claim 10 wherein the thickness of said functional layer is no more than 1.5 μm.

16. The thermoformable biaxially oriented coextruded polyester film according to claim 1 wherein the film is thermoformable at a temperature in the range of 130° C. to 200° C.

17. The thermoformable biaxially oriented coextruded polyester film according to claim 1 wherein the copolyester base layer exhibits a degree of crystallinity which is lower than that of either of the outer layers.

18. The thermoformable biaxially oriented coextruded polyester film according to claim 1 wherein the degree of crystallinity $X_{C-OUTER}$ of each of the outer layers is, independently, in the range of from 25% to 50%, and/or the degree of crystallinity $X_{C-BASE}$ of the copolyester base layer is in the range of from 10% to 20%, wherein the degree of crystallinity of a layer is calculated from the enthalpy of fusion measured by Differential Scanning calorimetry.

19. The thermoformable biaxially oriented coextruded polyester film according to claim 17, wherein $[X_{C-OUTER} - X_{C-BASE}/X_{C-OUTER} \times 100]$ is at least 40%, wherein $X_{C-BASE}$ is the degree of crystallinity of the copolyester base layer and $X_{C-OUTER}$ is the degree of crystallinity of the outer layers, and wherein the degree of crystallinity of a layer is calculated from the enthalpy of fusion measured by Differential Scanning calorimetry.

20. The thermoformable biaxially oriented coextruded polyester film according to claim 19, wherein $[X_{C\text{-}OUTER} - X_{C\text{-}BASE}/X_{C\text{-}OUTER} \times 100]$ is no more than 70%, wherein $X_{C\text{-}BASE}$ is the degree of crystallinity of the copolyester base layer and $X_{C\text{-}OUTER}$ is the degree of crystallinity of the outer layers, and wherein the degree of crystallinity of a layer is calculated from the enthalpy of fusion measured by Differential Scanning calorimetry.

* * * * *